United States Patent
Lombardo

(12) 
(10) Patent No.: US 7,909,304 B1
(45) Date of Patent: Mar. 22, 2011

(54) FUEL PUMP NOZZLE HOLDING DEVICE

(76) Inventor: Frank S. Lombardo, Shavertown, PA (US)

( * ) Notice: Subject to any disclaimer, the term of this patent is extended or adjusted under 35 U.S.C. 154(b) by 130 days.

(21) Appl. No.: 12/497,490

(22) Filed: Jul. 2, 2009

(51) Int. Cl.
*F16K 35/00* (2006.01)

(52) U.S. Cl. .......................................... 251/90; 141/392

(58) Field of Classification Search .................. 251/90, 251/111, 116; 141/392
See application file for complete search history.

(56) References Cited

U.S. PATENT DOCUMENTS

| | | | | |
|---|---|---|---|---|
| 4,184,524 A | * | 1/1980 | Lorenz | 141/392 |
| 4,408,791 A | | 10/1983 | Griffin et al. | |
| 4,690,182 A | * | 9/1987 | Knaus | 141/392 |
| D297,810 S | | 9/1988 | Stafford | |
| 4,958,791 A | * | 9/1990 | Nakamura | 248/74.1 |
| 5,423,501 A | * | 6/1995 | Yu | 248/61 |
| 5,487,418 A | * | 1/1996 | Reyes | 141/392 |
| 5,622,341 A | * | 4/1997 | Stana | 248/74.1 |
| 5,752,554 A | * | 5/1998 | Campbell | 141/392 |
| 6,830,086 B2 | | 12/2004 | Smith et al. | |
| 7,040,361 B2 | | 5/2006 | Soussan et al. | |
| 2002/0185622 A1 | | 12/2002 | Bruns | |
| 2006/0185765 A1 | | 8/2006 | Bates, III | |

* cited by examiner

*Primary Examiner* — John K Fristoe, Jr.

(57) ABSTRACT

A fuel pump nozzle holding device for allowing a user to engage a trigger handle of a fuel nozzle and pump gas without having to hold the trigger handle comprising a ring having a first half and a second half, wherein the first half and the second half are connected via a hinge at one end. At the second end, the first half and the second half can be connected by inserting a locking mechanism. A magnet is disposed on the ring that allows the device to be temporarily attached to a fuel tank cover of a car.

2 Claims, 3 Drawing Sheets

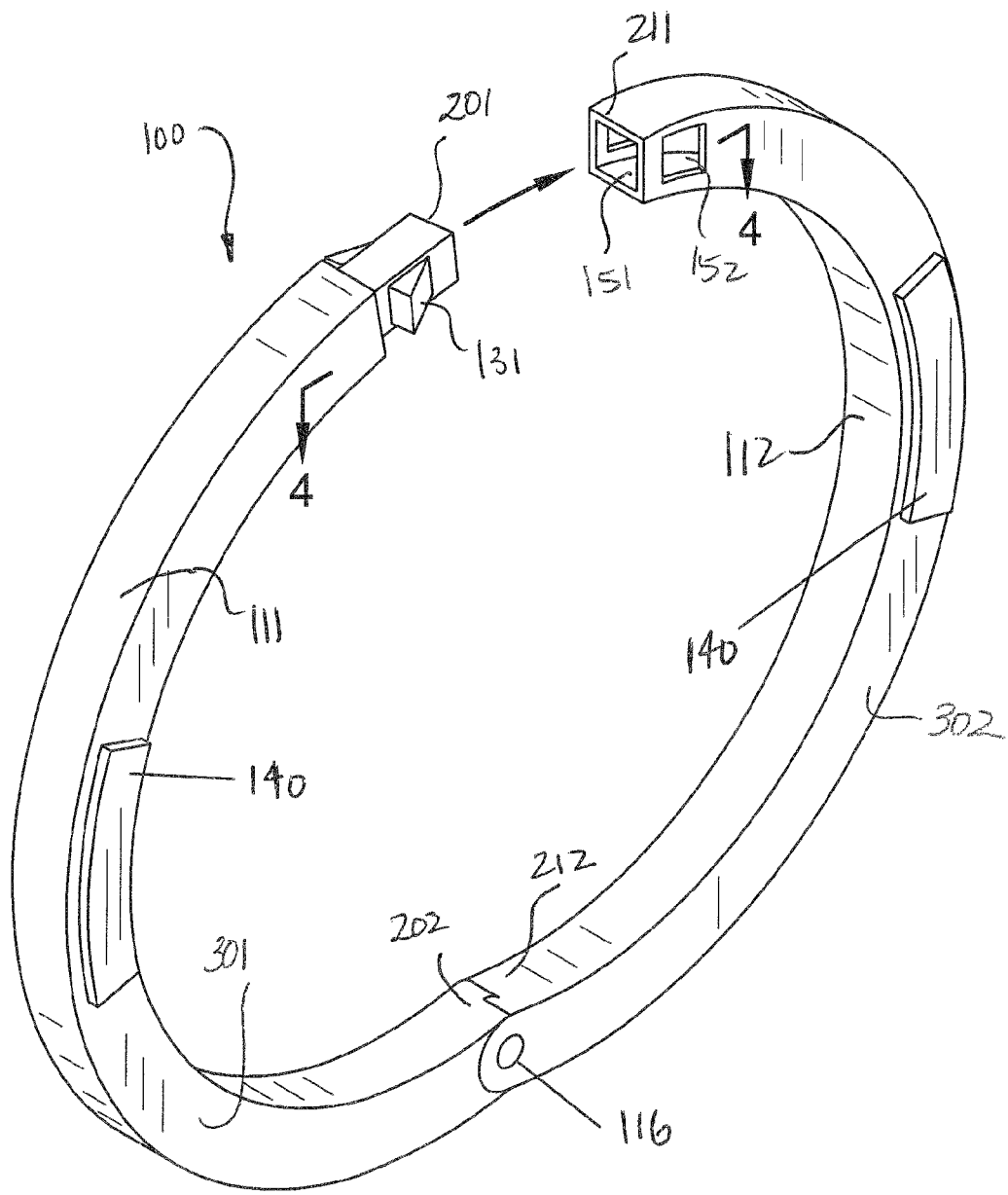
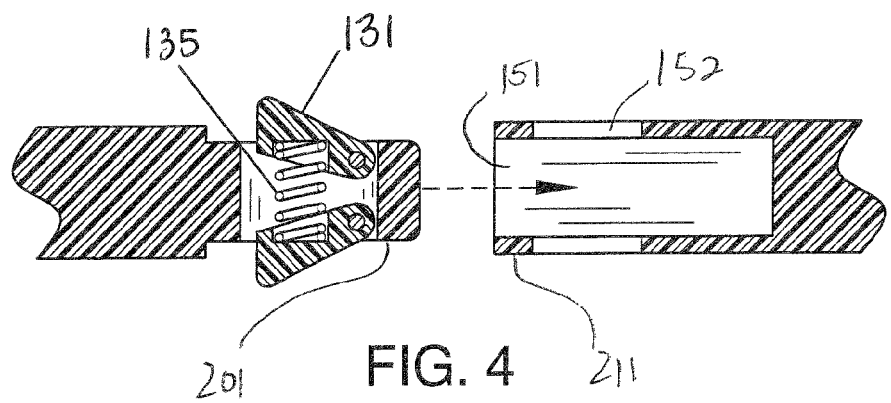

FUEL PUMP NOZZLE HOLDING DEVICE

FIELD OF THE INVENTION

The present invention is directed to device for helping a user dispense fuel form a fuel pump nozzle. More particularly, the present invention is directed to a device for squeezing a fuel pump nozzle to pump fuel.

BACKGROUND OF THE INVENTION

Most vehicle owner pump their own fuel at gas stations. The fuel pumps typically comprise a fuel nozzle and a trigger handle. A user squeezes the trigger handle to pump fuel into his/her vehicle. Some users may not have sufficient strength to squeeze the trigger handle for an extended period of time.

The present invention features a fuel pump nozzle holding device for allowing a user to engage a trigger handle of a fuel nozzle and pump gas without having to hold the trigger handle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a perspective view of the fuel pump nozzle holding device of the present invention.

FIG. 4 is a cross-sectional view of the fuel pump nozzle holding device of the present invention.

DESCRIPTION OF PREFERRED EMBODIMENTS

Figure 1:
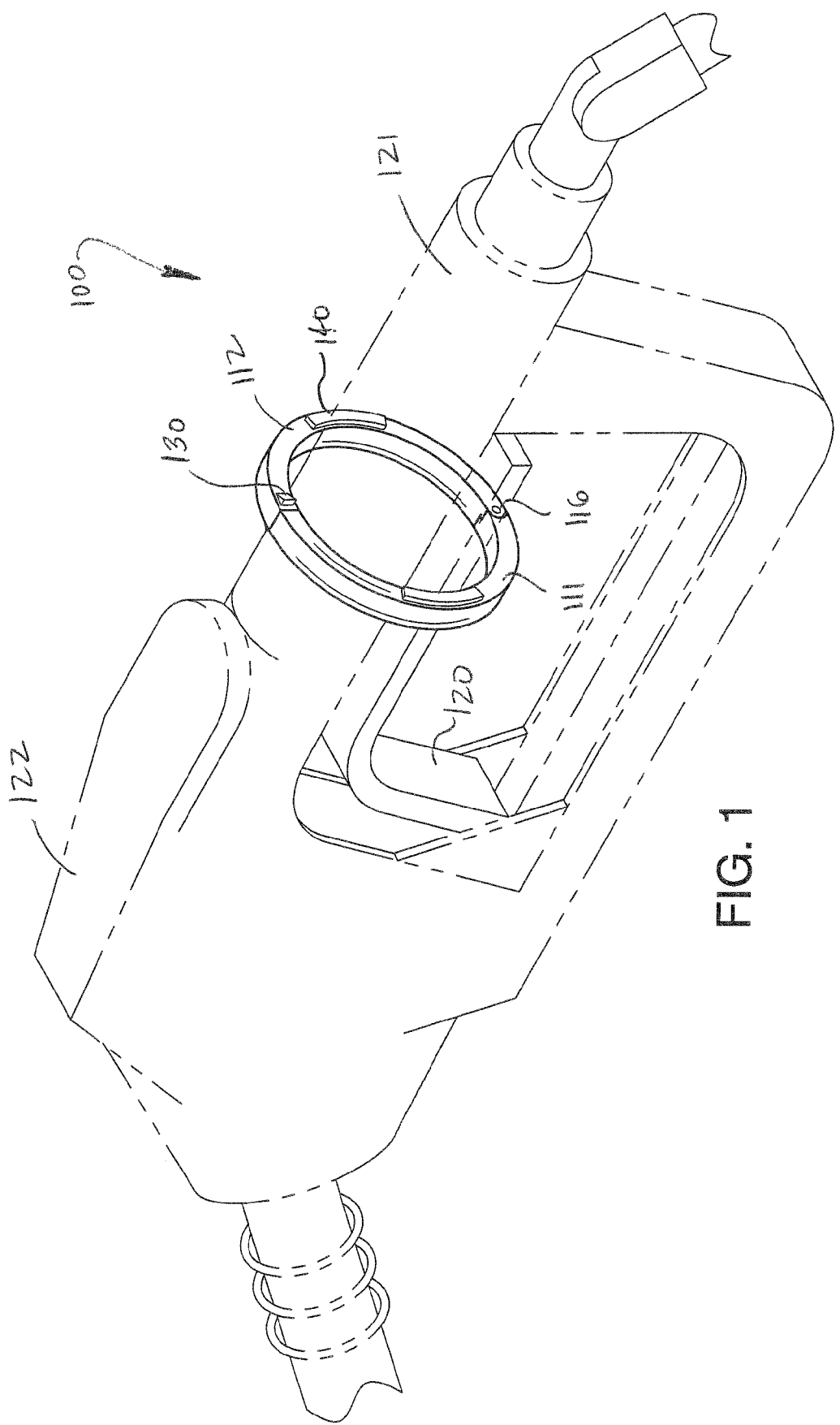
FIG. 1 is a perspective view of the fuel pump nozzle holding device of the present invention as used around a trigger handle and fuel pump nozzle.
Figure 2:
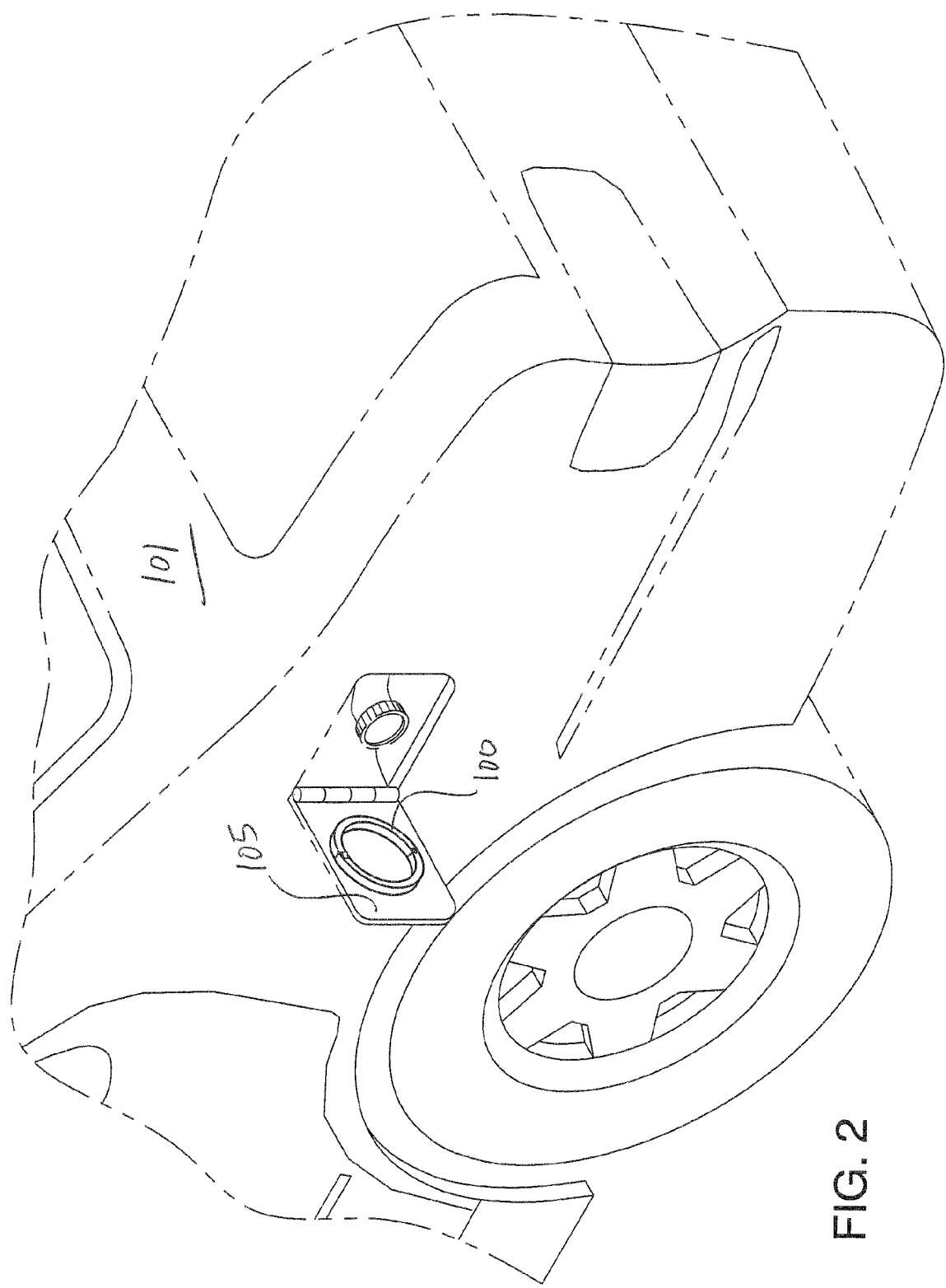
FIG. 2 is a perspective view of the fuel pump nozzle holding device of the present invention as attached to a fuel tank cover of a car via magnets.

The following is a listing of numbers corresponding to a particular element refer to herein:
- 100 fuel pump nozzle holding device
- 101 car
- 105 fuel tank cover
- 111 first half ring
- 112 second half ring
- 116 hinge
- 120 trigger handle of fuel pump nozzle
- 121 top of fuel nozzle
- 122 fuel nozzle
- 130 locking mechanism
- 131 tab
- 135 spring
- 140 magnet
- 151 first aperture
- 152 second aperture
- 201 first end of first half of ring
- 202 second end of first half of ring
- 211 first end of second half of ring
- 212 second end of second half of ring
- 301 back surface of first half ring
- 302 back surface of second half ring
- 312 locking teeth component
- 350 locking teeth compartment Referring now to FIGS. 1-8, the present invention features a fuel pump nozzle holding device 100 for allowing a user to engage a trigger handle 120 of a fuel nozzle 122 and pump gas without having to hold the trigger handle 120. The fuel pump nozzle holding device 100 comprises a first half ring 111 and a second half ring 112. The first half ring 111 has a first end 201 and a second end 202, and the second half ring 112 has a first end 211 and a second end 212. The second end 202 of the first half ring 111 is pivotally connected to the second end 212 of the second half ring 112 via a hinge mechanism 116. The first end 201 of the first half ring 111 can connect to the first end 211 of the second half ring 112. The device 100 can move between an open position (where the first ends of the respective rings do not connect) and a closed position (where the first ends of the respective rings connect) via the hinge 116.

The device 100 can be secured in the closed position via a locking mechanism 130. In some embodiments, the locking mechanism 130 includes a spring-loaded clasp. For example, a tab 131 is disposed on the first end 201 of the first half ring 111. The tab 131 can move between a first position where it protrudes from the first end 201 of the first half ring 111 and a second position where it is pushed into the first end 201 of the first half ring 111. The tab 131 is biased in the out position caused by a spring 135. The tab 131 can be inserted into a first aperture 151 disposed on the first end 211 of the second half ring 112 (e.g., the tab 131 can be squeezed down to the second position and slid into the first end 211 of the second half ring 112 via the first aperture 151). In some embodiments, the tab 131 can further return to the first position by protruding through a second aperture 152 disposed on the first end 211 of the second half ring 112 (see FIG. 4). To release the device 100 from the closed position, a user can squeeze the tab 131 to the second position and slide it out of the first aperture 150. Such spring-loaded clasps are well known to one of ordinary skill in the art. The locking mechanism 130 is not limited to a spring-loaded clasp.

In some embodiments a user can attach the device 100 to the fuel pump 122 by opening the device 100 via the hinge mechanism 116, wrapping the device 100 around the trigger handle 120 and the top 121 of the fuel nozzle 122, and utilizing the locking mechanism 130 (e.g., squeezing the tab 131 and inserting it into the first aperture 150). When the fuel tank is filled, the tab 131 can be squeezed and the first end 201 of the first half ring 111 can be slid out of the first aperture 150.

In some embodiments, a magnet 140 is disposed on the first half ring 111 and/or the second half ring 112. The magnet 140 allows the device 100 to be temporarily attached to the fuel tank door 105 of the car 101. In some embodiments, a first magnet 140 is disposed on a back surface 301 of the first half ring 111. In some embodiments, a second magnet 140 is disposed on a back surface 302 of the second half ring 112. In some embodiments, a third magnet 140 is disposed on a front surface of the first half ring 111. In some embodiments, a fourth magnet 140 is disposed on a front surface of the second half ring 112.

The holding device of the present invention may be constructed from a variety of materials. For example, in some embodiments, the holding device is constructed from a material comprising a metal, a plastic, the like, or a combination.

The disclosures of the following U.S. Patents are incorporated in their entirety by reference herein: U.S. Pat. No. 6,830,086; U.S. Pat. No. 4,408,791; U.S. Pat. No. 7,040,361 B2; U.S. Pat. Application No. 2006/0185765 A1; U.S. Pat. Application No. 2002/0185622 A1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fuel pump nozzle holding device for clamping around a trigger handle of a fuel nozzle and a top portion of the fuel nozzle, said fuel pump nozzle holding device comprising:
    (a) a first half ring having a first end and a second end;
    (b) a second half ring having a first end and a second end, wherein the second end of the first half ring is pivotally connected to the second end of the second half ring via a hinge mechanism, wherein the device can move between an open position and a closed position;
    (b) a tab disposed on the first end of the first half ring, the tab is moveable between a first position where the tab protrudes from the first end of the first half ring and a second position where the tab is inserted into the first end of the first half ring, wherein the tab is biased in the second position caused by a spring disposed in the first end of the first half ring;
    (c) a first aperture disposed in the first end of the second half ring for receiving the tab; wherein the device can be secured in the closed position by moving the tab to the second position, inserting the tab into the first aperture, and allowing the tab to move back to the first position by protruding through a second aperture disposed in the first end of the second half ring;
    (d) a magnet disposed on a back surface of the first half ring and a magnet disposed on a back surface of the second half ring;
wherein the device is clamped around a trigger handle of a fuel nozzle and a top portion of the fuel nozzle, and then secured in the closed position.

2. The device of claim 1, wherein a third magnet is disposed on a front surface of the first half ring and a fourth magnet is disposed on a front surface of the second half ring.

* * * * *